Patented May 13, 1924.

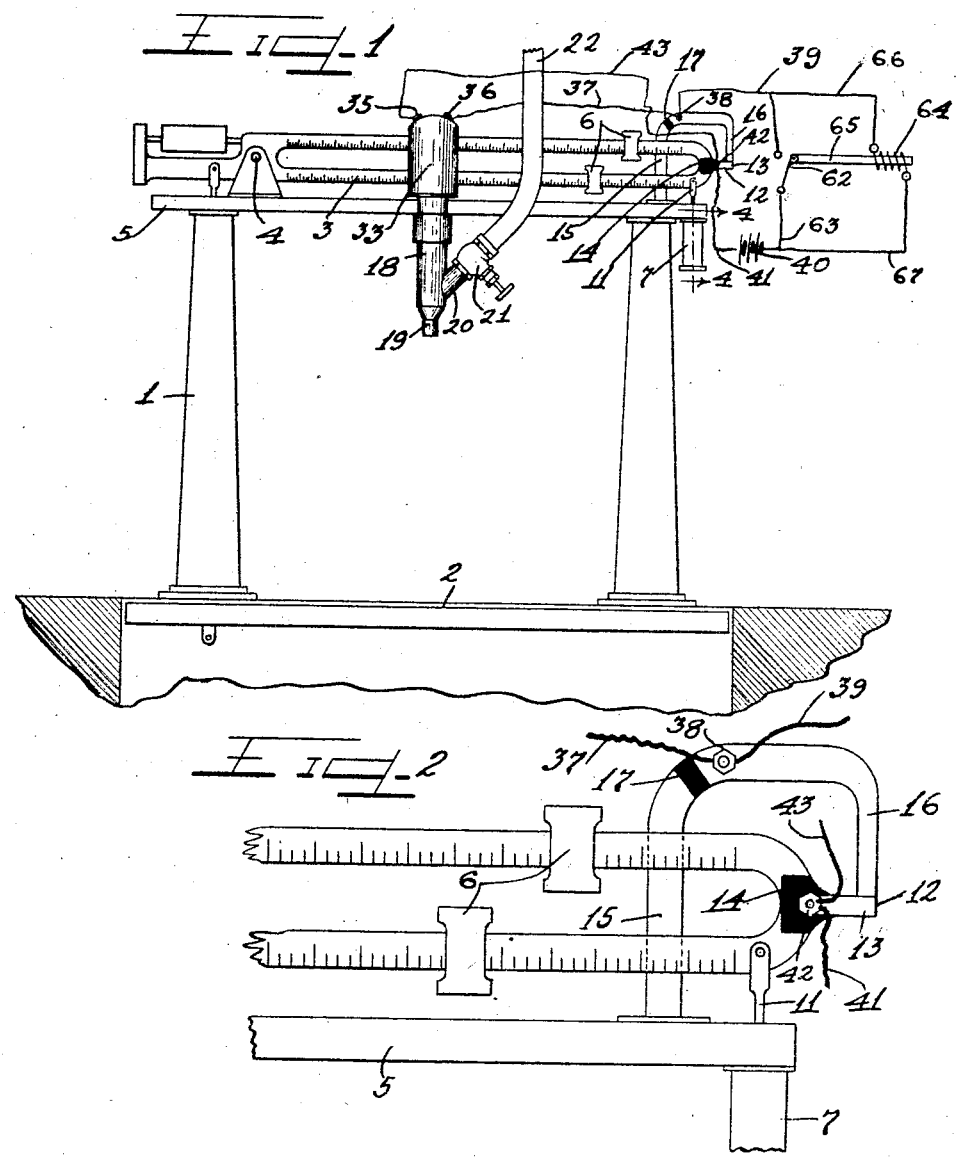

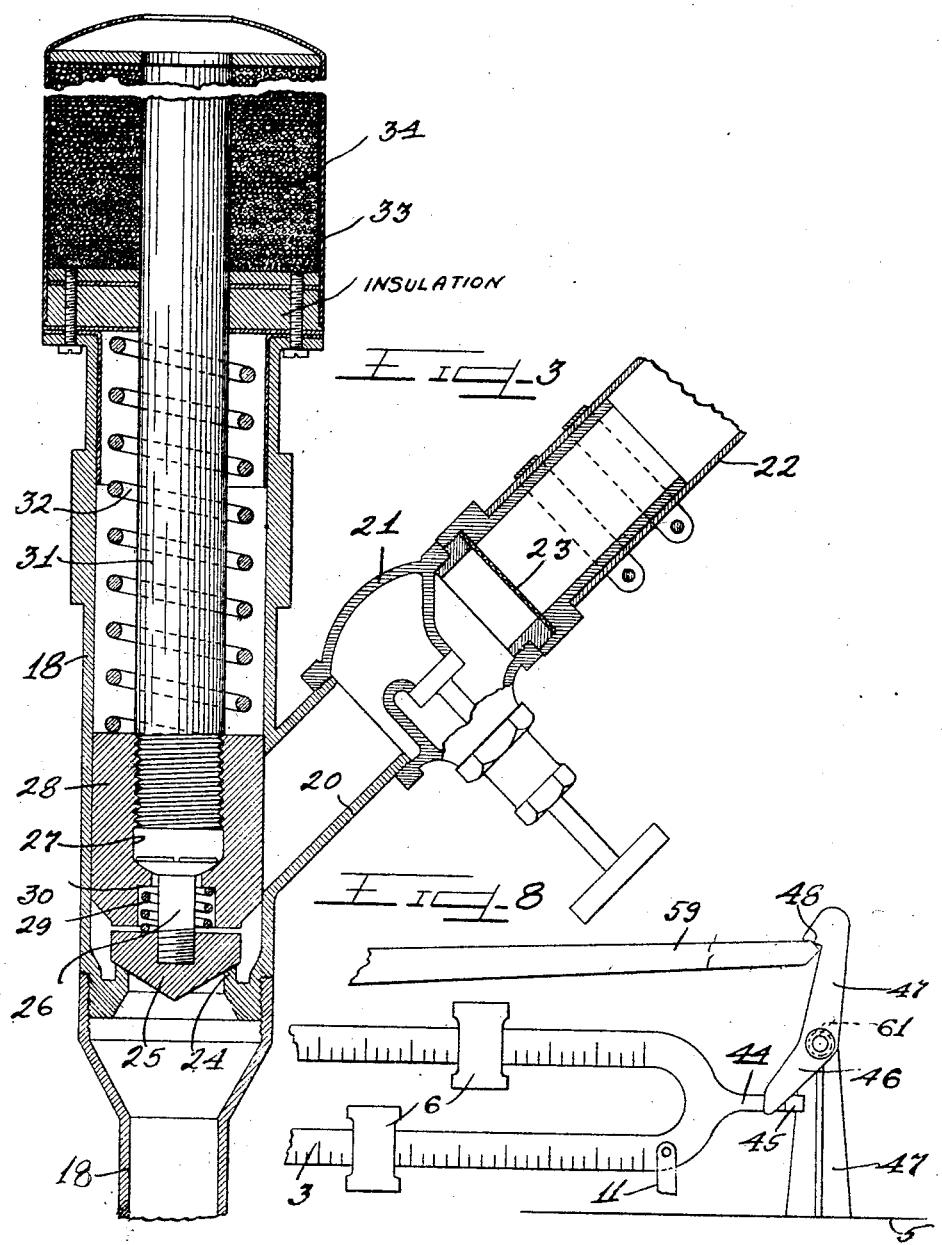

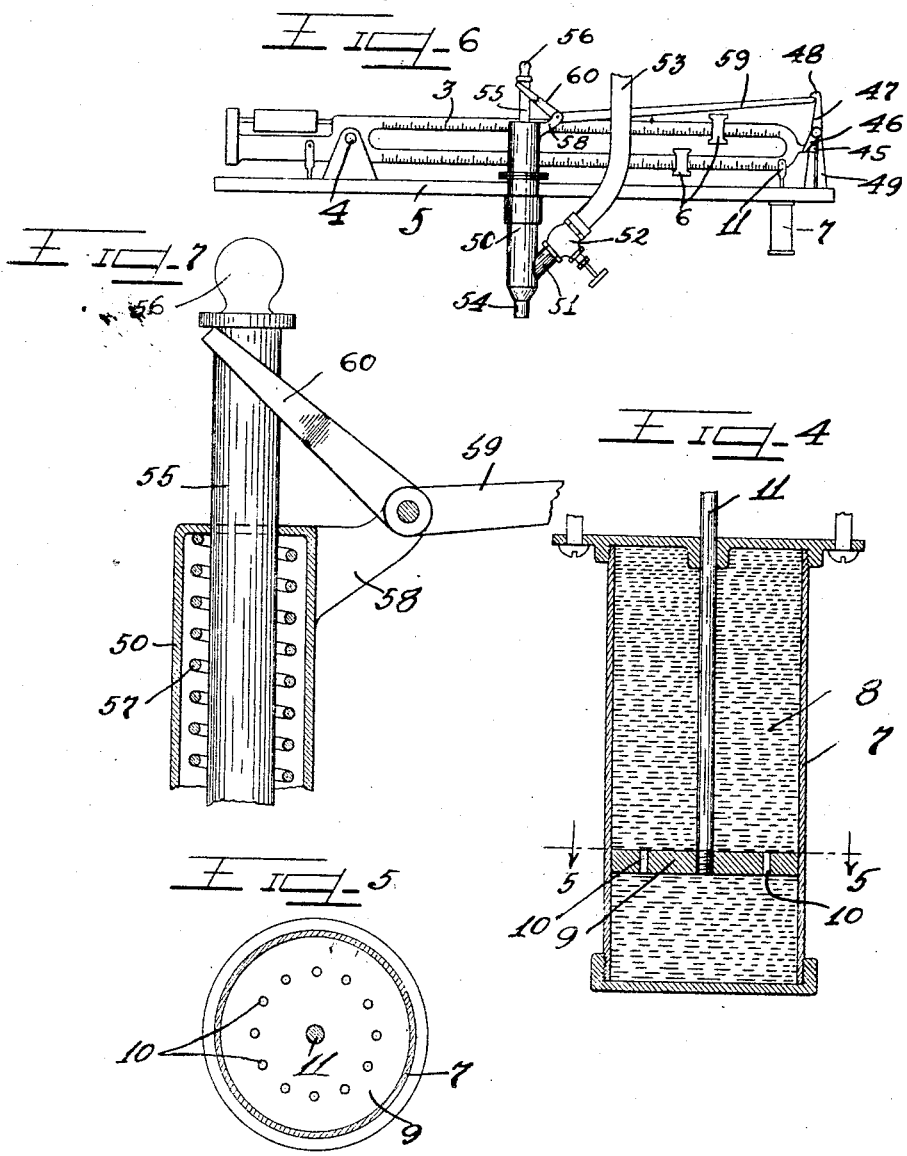

1,494,082

UNITED STATES PATENT OFFICE.

CHARLES G. SWANK, OF CHICAGO, ILLINOIS.

MACHINE FOR WEIGHING LIQUIDS.

Application filed December 5, 1921. Serial No. 520,030.

*To all whom it may concern:*

Be it known that I, CHARLES G. SWANK, a citizen of the United States, and a resident of the city of Chicago, in the county of Cook and State of Illinois, have invented certain new and useful Improvements in a Machine for Weighing Liquids; and I do hereby declare that the following is a full, clear, and exact description of the same, reference being had to the accompanying drawings, and to the numerals of reference marked thereon, which form a part of this specification.

To compensate for the change in volume in liquids resulting from changes in temperature, it is the purpose of this invention to provide a device adapted to permit predetermined volumes or weights of liquids to be dispensed into containers on a scale depending upon the adjustment or setting of members with respect to a graduated member forming a part of the scale.

This invention relates to an improved machine for weighing liquids and having mechanisms adapted to act automatically when a predetermined weight of liquid has been dispensed from a nozzle into a container, to release a control valve in the nozzle, thereby shutting off the flow of liquid therefrom.

It is an object of this invention to provide a machine for automatically weighing liquids or other materials.

It is also an object of the invention to provide a scale with a contact mechanism for the purpose of controlling an electrically operable valve mechanism in a liquid despensing nozzle associated with the scale.

Another object of the invention is the construction of a scale for weighing materials, said scale having a contact member on the scale beam adapted to act, when a predetermined weight of material dispensed from a nozzle has been weighed on the scale, to contact a terminal member on the scale to short circuit a solenoid circuit and establish a switch control circuit, thereby simultaneously permitting a control spring to act automatically to close a valve in the nozzle and permitting a solenoid to open a control switch.

It is a further object of this invention to provide a scale having a liquid dispensing nozzle associated therewith and provided with a control valve which is adapted to be automatically released upon the closing of a contact device governed by the scale beam, the movement of which is made gradual by a dash pot device mounted on the scale and connected with said beam.

It is furthermore an object of the invention to provide a liquid weighing machine wherein a spring controlled control valve in a liquid dispensing nozzle is associated with a scale, the beam of which is provided with a contact member adapted, when a predetermined weight of liquid has been dispensed from the nozzle, to actuate a mechanism on said scale thereby causing automatic release of the control valve and closing of the same by said spring and automatic opening of a control switch.

It is an important object of this invention to provide a simple and effective weighing machine adapted to permit predetermined weights of liquid or other material to be weighed automatically.

Other and further important objects of this invention will be apparent from the disclosures in the specification and the accompanying drawings.

The invention (in a preferred form) is illustrated in the drawings and hereinafter more fully described.

On the drawings:

Figure 1 is a front elevation of a liquid weighing machine embodying the principles of this invention and showing a wiring diagram connected therewith.

Figure 2 is an enlarged fragmentary elevation of the scale beam and the switch mechanism.

Figure 3 is an enlarged vertical detail section taken through the liquid dispensing nozzle and the valve mechanisms therein.

Figure 4 is an enlarged detail section taken on line 4—4 of Figure 1.

Figure 5 is a transverse section taken on line 5—5 of Figure 4.

Figure 6 is a front elevation of the upper portion of a scale provided with a modified form of valve control mechanism.

Figure 7 is an enlarged sectional view of the upper portion of the control valve casing.

Figure 8 is an enlarged fragmentary view of the free end of the scale beam and the mechanisms operated thereby.

As shown on the drawings:

The reference numeral 1 indicates a weighing scale provided with a weighing platform 2 and with a graduated double beam 3 pivotally supported at 4 upon the beam supporting plank or shelf 5. Weighing members 6 are slidably mounted on the graduated bars of the beam 3. To control the pivoted movement of the scale beam 3 so that the same will operate with a steady movement, a dash pot 7 containing oil 8, is supported on the scale shelf 5 below the free end of the beam 3. Disposed within the dash pot 7 is a plunger 9 having a plurality of openings 10 therein. Secured to the plunger 9 is a plunger rod 11 which projects through the top of the dash pot and through the shelf 5 and has the upper end pivotally attached to the beam 3. Integrally formed on the end of the beam 3 is an arm or finger 12 having a terminal or contact plate 13 mounted thereon and separated therefrom by an insulating plate 14. Securely supported on the top of the shelf 5 is a bracket or arm 15 to the upper end of which is secured a contact finger 16 separated from the bracket by insulation 17. The fingers 12 and 16 afford a switch or contact mechanism.

Supported on the scale shelf 5 above the scale platform 2 is a liquid dispensing mechanism comprising a casing 18 to the lower end of which is attached a nozzle 19. Integrally formed on the casing 18 is a pipe elbow 20 to which an emergency gate or shut off valve 21 is secured. Secured to the intake end of the emergency valve 21 is one end of a flexible liquid supply pipe 22. A filter screen 23 is provided across the supply pipe 22 where it joins the emergency valve 21 as illustrated in Figure 3. The pipe 22 is connected with a liquid reservoir or supply tank containing gasoline, kerosene, oil or any other liquid or material which is to be dispensed. Formed in the lower end of the casing 18 is a valve seat 24 upon which a valve head 25 is adapted to seat. The valve head 25 is tapered and is secured to the projecting lower end of a screw bolt 26. The head of the screw bolt 26 is seated in a chamber 27 formed within a piston or plunger 28. The shank of the screw bolt 26 projects out of the lower passaged end of the piston 28 and has a spring 29 coiled therearound. The lower end of the spring 29 seats upon the valve head 25 to hold the same on the valve seat, while the upper end of the spring 29 bears against a shoulder 30 provided within the piston 28. Secured in the piston chamber 27 is the lower threaded end of a solenoid core 31. A coiled spring 32 is engaged in the casing 18 around the solenoid core 31 and rests upon the piston 28. The upper end of the coiled spring 32 contacts the lower end of a solenoid casing 33 which is rigidly secured upon the upper end of the casing 18 as shown in Figure 3. The core 31 projects into the solenoid casing and into a solenoid coil 34, disposed therein. The ends of the solenoid coil 34 are attached to binding posts 35 and 36 mounted on the solenoid casing 33. The top of the solenoid casing 33 is provided with an opening to permit the upper end of the solenoid core 31 to project therethrough when the solenoid is energized to open the outlet valve 25.

Connected to the solenoid terminal post 36 is one end of a wire 37 the other end of which is connected to a terminal post 38 on the switch member 16. Also connected to the terminal post 38 is one end of a wire 39 the other end of which is connected to one terminal of a circuit control switch 62. Connected to the other terminal of the switch 62 is one end of a wire 63 the other end of which is connected to a source of electrical energy such as batteries 40 which may be located in any convenient place. Attached to the other terminal of the batteries is a wire 41 the other end of which is connected to a terminal post 42 on the switch member 13 on the scale beam. Attached to the terminal post 42 is one end of a wire 43 the other end of which is connected to the solenoid terminal post 35. The upper end of the solenoid core 31 is permitted to project out of the solenoid casing 33 when the solenoid coil is energized thereby affording a signal that the outlet valve 25 is open. The upper end of the solenoid core may be painted with colored rings or stripes to make the same conspicuous.

For the purpose of automatically opening the control switch 62 at the same time that the solenoid circuit is short circuited, a switch control mechanism is provided and embraces a solenoid 64 having a core 65 which is pivotally connected to the switch 62. Connected to one terminal of the solenoid 64 is one end of a wire 66, the other end of which is connected to the terminal post 38. Connected to the second terminal of the solenoid 64 is one end of a wire 67, the other end of which is connected to the batteries 40.

Figures 6, 7 and 8 illustrate a modified form of the device wherein the scale beam 3 has an arm or projection 44 integrally formed on the end thereof. The arm 44 is bent to afford a projection or head 45 which engages beneath the back of the short arm 46 of a spring controlled bell-crank having a long arm 47, the end of which is provided with a hook 48. The bell-crank 46—47 is pivotally supported upon a bracket 49 secured upon the scale shelf 5.

Rigidly secured upon the scale shelf 5 is a casing 50 having an elbow or arm 51 formed on one side thereof. Secured to the elbow 51 is an emergency valve 52 of any desired type. Connected with the emergency valve 52 is one end of a flexible hose or pipe 53, the other end of which is connected with a supply reservoir or tank holding gasoline, kerosene or oil. An outlet nozzle 54 is secured to the lower end of the casing 50. Mounted in the casing 50 is an outlet valve similar in construction to that illustrated in Figure 3. A valve stem 55 is disposed in the casing 50 and has the lower end connected to the outlet valve. The upper end of the valve stem 55 projects outwardly through an opening in the top of the casing 50 and is provided with a head 56. A coiled spring 57 is engaged in the casing 50 and acts to move the outlet valve in the casing 50 into closed position.

Formed on the upper portion of the casing 50 is a bracket or arm 58 on which is pivotally mounted a bell-crank comprising a long arm 59 and a short arm 60. The end of the short arm 60 is forked to engage around the valve stem 55 beneath the head 56. The end of the long bell-crank arm 59 is tapered and when depressed is adapted to be engaged by the hook 48 of the bell-crank 46—47 thereby causing the short bell-crank arm 60 to swing upwardly against the head 56 thereby lifting the valve stem 55 and opening the outlet valve in the casing 50. The spring 61 shown in dotted lines in Figure 8 acts to hold the hook 48 of the bell-crank arm 47 in engagement with the end of the long arm 59.

The operation is as follows:

In plants where large quantities of gasoline, kerosene, oil and other liquids are sold by the can or barrel it is essential that each container to be filled should contain an exact weight of liquid. In the old system of dispensing liquid no means was provided for measuring predetermined weights of liquids. To obviate this difficulty the present invention provides a liquid weighing machine adapted to fill containers with predetermined amounts of liquid by weight, corresponding to a given volume at a given specific gravity and temperature.

A can, barrel or other container to be filled with gasoline, or some other liquid, is placed on the scale platform 2 below the nozzle 19. A predetermined weight of liquid to be dispensed to correspond to a given specific gravity is then computed by means of a chart or other convenient means to permit proper setting of the scale. Allowing for the weight of the barrel or other container, the slidable members 6 on the scale beam are now adjusted for the desired weight, thereby causing the scale beam to swing downwardly.

Normally the circuit control switch 62 is open so that the circuit from the batteries 40 to the main solenoid coil is open, thereby permitting the spring 32 to hold the outlet valve 25 in its closed position seated on the valve seat 24. The shut-off or emergency valve 21 is normally open and is provided for emergencies should anything happen to the valve 25. When a container to be filled with a predetermined weight of liquid is placed on the platform 2 underneath the discharge nozzle 19, the scale is properly set. The switch 62 is now closed manually thereby establishing a circuit through the solenoid coil 34. The solenoid core 31 is thus drawn upwardly, thereby opening the control valve 25 permitting gasoline from the supply tank to flow through the pipe 22 through the open valve 21 and the control valve 24—25 out of the nozzle 19 into the container. When sufficient gasoline by weight has entered the container to correspond to the adjustment of the scale, the scale beam is gradually swung upwardly until the contact or switch member 12 on the beam arm contacts the contact or switch member 16. This operation short circuits the main solenoid 34 which is thus deenergized permitting the spring 32 to act automatically to close the control valve thereby shutting off the flow of gasoline into the container. The container is thus filled with the correct weight of liquid corresponding to the number of gallons desired. Simultaneously with the short circuiting of the main solenoid by the contacting of the contact members 12 and 16 an auxiliary circuit is automatically established through the auxiliary solenoid 64, thereby causing movement of the solenoid core 65 and automatic opening of the switch 62. The circuit to the main solenoid is thus automatically opened and the short circuit broken thereby permitting the spring 32 to act automatically to close the valve 25 and hold the same in closed position until the switch 62 is again manually closed.

The filled container is now removed from the scale platform 2 and another empty container may be placed on the scale platform underneath the nozzle 19. When a filled container is removed from the scale platform the scale beam 3 drops back into normal position thereby breaking the contact between the contact members 13 and 16. The switch 62 having been previously opened automatically, no circuit is established through the solenoid coil 34, thereby permitting the spring 32 to hold the valve 25 closed. To fill the second container with a predetermined weight of liquid, the scale is again set if necessary, after which the circuit control switch 62 is again manually closed to cause opening of the valve 25 and filling of the second container. When the main solenoid is energized the upper end of the solenoid core projects through the open top of the solenoid casing 33 to afford a visible signal that the valve is open. Any number of containers may thus be filled with a predetermined weight of liquid. Containers of different capacity of course will require different adjustments of the scale beam members 6.

The screen 23 provided between the pipe 22 and the emergency valve 21 acts as a filter to screen the liquid before entering the containers on the scale platform. The dash pot 7 is provided to cause a smooth even movement of the scale beam thereby preventing accidental closing of the switch members due to sudden or jerky movements of the scale beam.

In the modified form of the device illustrated in Figures 6, 7 and 8 the operation is similar to that already described. In this case, however, the solenoid valve control mechanism is replaced by a double bell-crank arrangement. Normally the hook 48 of the bell-crank arm 47 is disengaged from the tapered end of the long bell-crank arm 59, thereby permitting the spring 57 to hold the nozzle control valve in closed position. Normally the emergency valve 52 is open. A barrel to be filled with a predetermined weight of liquid is placed on the scale platform below the nozzle 54. The long bell crank arm 59 is now manually depressed to engage beneath the hook 48 of the spring controlled bell crank 46—47. When this is done the nozzle valve is opened by the upward swing of the short bell crank arm 60, thereby permitting gasoline from the supply tank to flow through the pipe 53 and the open emergency valve 52 through the open control or outlet valve within the casing 50 and out through the discharge nozzle 54 into the container on the scale platform. When the required weight of gasoline has been discharged into the container, the scale beam rises thereby causing the projection 45 on the beam extension 44 to contact the short bell-crank arm 46 to swing the same upwardly, thereby moving the long bell-crank arm 47 outwardly disengaging the hook 48 from the long bell-crank arm 59 which is swung upwardly by the action of the spring 57. This release of the main bell-crank permits the spring 57 to act automatically to shut the control valve in the casing 50, thereby stopping the flow of gasoline into the container.

The filled container is now removed from the scale platform and another container is placed under the nozzle. With the removal of the filled barrel from the scale platform the scale beam 3 falls back into normal position thereby permitting the spring 61 to move the long bell-crank arm 47 inwardly into normal latching position. To fill the next container with a predetermined weight of liquid the bell-crank arm 59 is again manually depressed. With the downward movement of the bell-crank arm 59 the tapered end thereof contacts the hooked end of the bell-crank 46—47 and temporarily trips or swings the same out of the way to permit the tapered end of the bell-crank arm 59 to engage beneath the hook 48. The filling operation may be repeated as often as desired. At the end of a filling operation or in case of emergency the ermergency valve 52 may be manually closed.

It will of course be understood that the discharge nozzle mechanism may be located in any convenient position other than that shown and described, and that liquids of various kinds or other materials such as grains and the like may be weighed in any desired amounts depending upon the setting of the scale members 6 on the scale beam. While a particular type of beam scale is illustrated, it will of course be understood that other types of platform scales having graduated dials instead of graduated beams may be used if preferred.

I am aware that numerous details of construction may be varied through a wide range without departing from the principles of this invention, and I therefore do not purpose limiting the patent granted otherwise than necessitated by the prior art.

I claim as my invention:

1. The combination with a scale, of a liquid discharge nozzle associated therewith, a discharge valve therein, resilient means for holding said valve in closed position, a main solenoid connected with said valve, a switch connected with the main solenoid adapted to be closed to cause said main solenoid to open said valve against the action of said resilient means to permit a liquid to be discharged from said nozzle into a container on said scale, contact members on the scale adapted to contact one another when a predetermined weight of liquid has been discharged into said container to cause short circuiting of said main solenoid to permit said resilient means to automatically close said valve, and a second solenoid connected with said switch adapted to be energized simultaneously with the contacting of said contact member and short circuiting of the main solenoid to cause automatic opening of said switch.

2. The combination with a scale, of a discharge mechanism thereon, a valve therein, means for holding the valve in closed position, a valve control mechanism, a switch connected therewith adapted to be closed to cause opening of said valve to permit a liquid to be discharged from said discharge mechanism, contact members controlled by the scale adapted to engage one another when a predetermined weight of liquid has been discharged to cause automatic closing of said valve and release of said valve control mechanism, and means connected with said switch adapted to act simultaneously with the engagement of said contact members to cause automatic opening of said switch.

3. The combination with a scale, of a discharge mechanism thereon, a valve therein, a spring for holding the valve in closed position, a valve control mechanism, means for causing operation of the valve control mechanism to cause opening of said valve, a circuit connected with said means, a battery in said circuit, contact members controlled by the scale adapted to engage one another when a predetermined weight of material has been discharged into a receptacle on said scale to cause closing of the circuit and release of the valve control mechanism and closing of the valve by said spring, and a mechanism connected with said means adapted to release the same when said contact members engage one another.

4. A machine for weighing materials comprising a scale, a discharge mechanism, means connected therewith and controlled by the operation of the scale to permit predetermined weights of the material to be discharged from said discharge mechanism into a receptacle on said scale, a control mechanism for said means, means for normally holding the control mechanism, and an automatically acting device governed by the operation of the scale to govern the release of said control mechanism.

In testimony whereof I have hereunto subscribed my name in the presence of two subscribing witnesses.

CHARLES G. SWANK.

Witnesses:
LEROY J. BRATZ,
FRED E. PAESLER.